(12) United States Patent
Kaplan et al.

(10) Patent No.: US 12,743,546 B2
(45) Date of Patent: Sep. 22, 2026

(54) SYSTEMS AND METHODS FOR PROTECTING DATA USING A PERSONAL DATA STORE CONTROLLED BY THE DATA SUBJECT

(71) Applicant: Google LLC, Mountain View, CA (US)

(72) Inventors: Benjamin Kaplan, Los Angeles, CA (US); Frankie Lamar, Jr., New York, NY (US); Radhika Ravindranath, South Plainfield, NJ (US); Dev Narendrabhai Patel, Gujarat (IN); Jacques Mouton, Tampa, FL (US)

(73) Assignee: Google LLC, Mountain View, CA (US)

( * ) Notice: Subject to any disclaimer, the term of this patent is extended or adjusted under 35 U.S.C. 154(b) by 136 days.

(21) Appl. No.: 18/513,002

(22) Filed: Nov. 17, 2023

(65) Prior Publication Data

US 2025/0165643 A1 May 22, 2025

(51) Int. Cl.
*H04L 29/06* (2006.01)
*G06F 21/31* (2013.01)
*G06F 21/60* (2013.01)
*G06F 21/62* (2013.01)

(52) U.S. Cl.
CPC .......... *G06F 21/6245* (2013.01); *G06F 21/31* (2013.01); *G06F 21/604* (2013.01)

(58) Field of Classification Search
CPC .................................................. G06F 21/6245
See application file for complete search history.

(56) References Cited

U.S. PATENT DOCUMENTS

2007/0203776 A1* 8/2007 Austin .............. G06Q 10/1053 705/321
2009/0265789 A1* 10/2009 Risan .................... H04L 69/329 726/26
2021/0056184 A1* 2/2021 Modani ................... G06F 21/44
2025/0028847 A1* 1/2025 Chen .................... G10L 15/063

* cited by examiner

*Primary Examiner* — Jason K Gee
(74) *Attorney, Agent, or Firm* — Lowenstein Sandler LLP

(57) ABSTRACT

A method includes receiving, by a processing device, a request to provide an entity with access to data associated with a user. A reference to location of the data within a data store controlled by the user and an access key associated with the data store is generated. Upon receiving an indication of user approval of the request, a response package is sent to the entity. The response package includes the reference to the location of the data, an obscured version of the data, and the access key. The data is obtained from the data store using the reference to the data and the access key provided by the entity. The data is provided to the entity.

20 Claims, 6 Drawing Sheets

SYSTEMS AND METHODS FOR PROTECTING DATA USING A PERSONAL DATA STORE CONTROLLED BY THE DATA SUBJECT

TECHNICAL FIELD

The disclosed implementations relate generally to data privacy tools. More particularly, the disclosed implementations relate to methods, systems, graphical user interfaces, and data structures for protecting data using a personal data store controlled by the data subject.

BACKGROUND

Data privacy tools provide software solutions designed to protect and manage the privacy of sensitive information for individuals and organizations.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a system and a computer-implemented methods that includes protecting data using a personal data store controlled by the data subject. In an implementation, the method includes receiving a request to provide an entity with access to data associated with a user. The method further includes generating a reference to the data within a data store controlled by the user and an access key associated with the data store. The reference to the data indicates a location of the data within the data store. The method further includes sending a response package to the entity upon receiving an indication of user approval of the request. The method further includes obtaining the data from data store using the reference to the location of the data and the access key provided by the entity to obtain the data. The method further includes providing the data to the entity.

In some embodiments, obtaining the data from the data store using the obscured version of the data and the access key includes authenticating the entity using the access key, and obtaining the data from the location of the data within the data store indicated by the reference to the data. In some embodiments, the request to provide the entity with access to the data associated with the user is received via a privacy gateway. In some embodiments, the method further includes revoking access privileges of the entity to the data associated with the user. In some embodiments, to revoke access privileges of the entity to the data associated with the user, the method includes deleting the reference to the data from the data store. In some embodiments, the method further includes receiving a user request from a client device associated with the user to modify the data. The request is received responsive to a user interaction with one or more GUI elements of an application associated with the data store. The method further includes updating the data within the data store in response to the user request.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
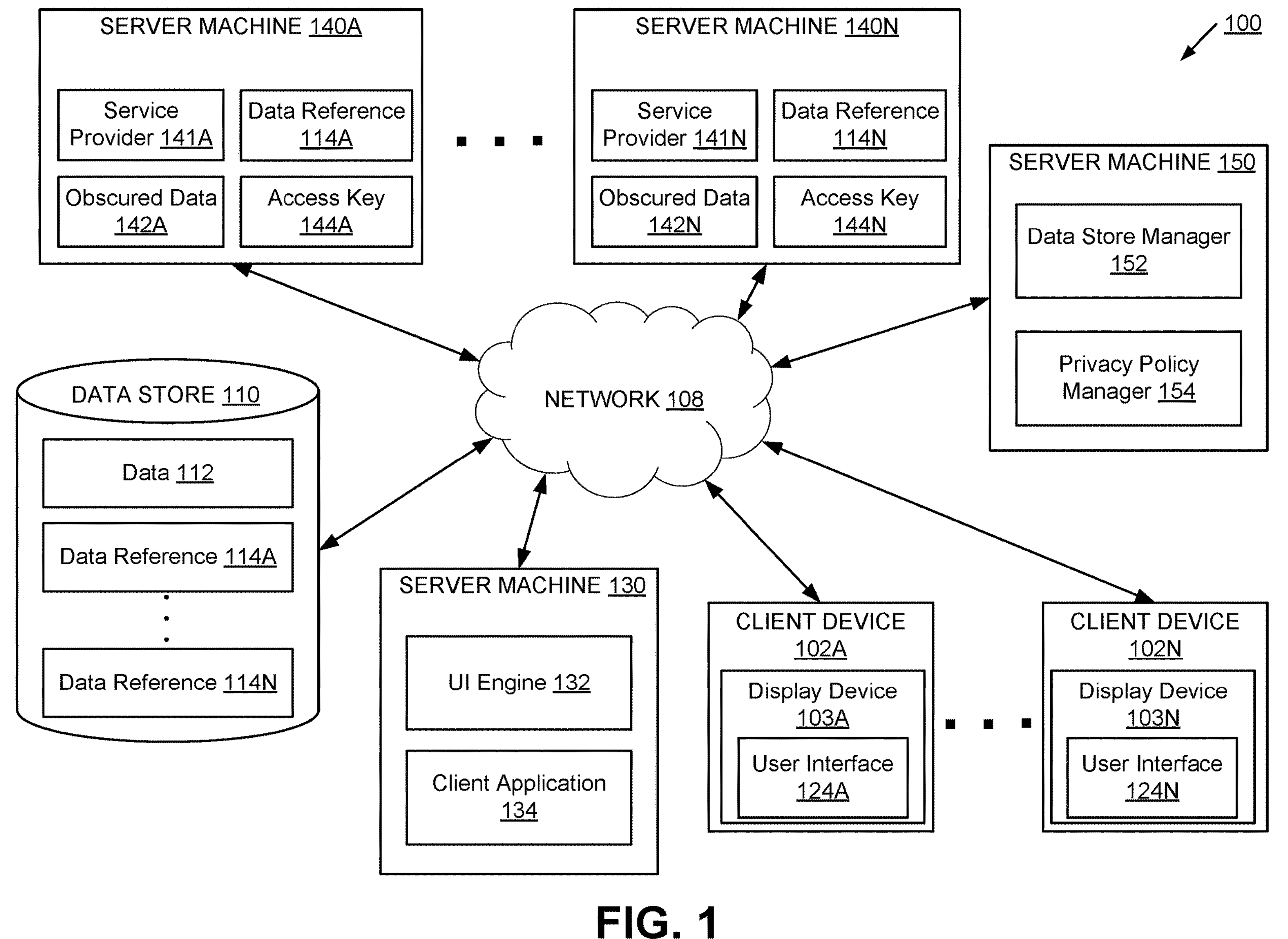
FIG. 1 illustrates an example of system architecture for enabling protecting data using a personal data store controlled by the data subject, in accordance with at least one embodiment of the present disclosure.

In an increasingly interconnected world, the collection, processing, and dissemination of personal and/or sensitive information permeates organizations. As a result, data privacy has become an important concern for many individuals. Data is stored, shared, and analyzed across a range of digital platforms, creating both opportunities and risks. For example, security breaches can lead to unauthorized access to sensitive personal data associated with an individual and may inflict substantial damage on the individual and the organization responsible for data leak. Sensitive personal data may include personally identifiable information (PII), sensitive personally identifiable information (SPII), or non-PII data about the data subject. A data subject is an individual who is the subject of or can be linked to personal data that is being collected, processed, and/or stored by an organization or another entity. In an illustrative example, personal data can include names, birthdays, phone numbers, financial information (credit card numbers, bank numbers, etc.), biometric data (fingerprints, iris scans, facial recognition data, etc.), internet protocol (IP) addresses, home addresses, social security numbers, the like. Security breaches that result in exposure of personal data can result in financial losses, reputational damage, operational disruption, legal consequences, and other far-reaching impacts for organizations and data subjects.

In some conventional systems, personal data about data subjects (e.g., customers, clients, patients and other individuals (e.g., their relatives, contacts, employees, etc.) who may be identified directly or indirectly by the personal data) may be collected, stored, and managed by an organization utilizing the personal data. However, the collection and management of personal data is subject to data protection and privacy laws, such as the General Data Protection Regulation (GDPR) in Europe, the California Consumer Privacy Act (CCPA) in California, and various other national, regional, and worldwide regulations. Failure to comply with data protection regulations may result in legal consequences, fines, and damages to an organization's reputation. Accordingly, many organizations implement data protection policies and invest in secure data storage and processing systems to ensure legal obligations are met and individual privacy is protected. In some instances, organizations may implement mechanisms to facilitate the fulfillment of data subjects' rights, such as the right to access their data, the right for the data to be forgotten (e.g., deleted), the right to object to processing, and the like. Nevertheless, because the organization stores the data, the primary responsibility of managing and protecting data still lies with the organization, and any vulnerability may lead to a data leak resulting in the aforementioned consequences. Additionally, the data subject may lack control over their personal data as it is processed and stored within a multitude of data stores associated with various organizations. Data subjects may not know what personal data organizations have access to, where organizations are sharing their data, when their data gets transferred, and how too access, delete, and otherwise manage their data across multiple organizations. This problem can be exacerbated when a data subject's information has been disseminated to a multitude of organizations.

Aspects and implementations of the present disclosure address the above and other deficiencies by providing systems and methods for protecting data using a personal data store controlled by the data subject. Data associated with a data subject may be stored in the personal data store (e.g., a database, a directory, a folder, a file, etc.) associated with the data subject and for which the data subject has control over. When a data subject (e.g., e.g., customer, client, patient or another individual (e.g., their relative, contact, employee, etc.) who may be identified directly or indirectly by the personal data) initiates a service request to a third-party service, the third-party service provider may use the data subject's personal data to provide a service. For example, the data subject may initiate a purchase on an electronic-commerce (e-commerce) website that requires the data subject's billing address, shipping address, and payment information to process the purchase and deliver the order. The e-commerce service may send a request (e.g., via a privacy gateway) for access to the data subject's personal information. The data subject may approve the request and, if needed, provide input (e.g., via a user interface (UI)) to cause a server (e.g., a privacy policy manager) to add the requested information into the data subject's personal data store. The privacy policy manager can generate a unique reference (e.g., a pointer) to the location of the data within the data store and send a response package back to the website. The response package may include an obscured version of the data, the reference to the data, and an access key to authenticate access to the personal data store. The third-party service provider can store the obscured data and the reference to the data on its servers in lieu of the requested data. For each instance the third-party service provider requires access to the data, the privacy policy manager can authenticate access of the third-party provider to the personal data store using the access key and obtain the personal data store using the reference to the data. The privacy policy manager may return the data from the location in the personal data store as indicated by reference to the data. Accordingly, the data subject's consent may be enforced for each instance of data collection or processing.

Because the system uses the specific reference or pointer to access requested data, the data subject may delete or modify the reference within their personal data store to revoke the third-party service provider's access to the underlying data. Other third-party services that have separate pointers or references to same underlying data may not be affected by deletion of the reference/pointer specific to the organization. Such a system can provide the data subject with fine-grained control over their personal data store by enabling the data subject to manage data access on a service-by-service basis without affecting the access rights of other service providers or modifying the underlying data.

In some embodiments, a user interface (UI) may be provided for presentation on a client device associated with the data subject. The user interface can display a view of entities (e.g., third-party services) that have access to the data subject's personal data or derived data. Derived data can refer to data generated from one or more portions of source data, such as personal data, by applying algorithms, inferences, formulas, or operations on the source data. In some embodiments, the UI may provide the data subject with the ability to update, revoke, or otherwise modify data access to an entity. In some embodiments, the data subject may indicate (e.g., via the UI) an amount of time to provide a third-party service with access to data. For example, the data subject can indicate that a given third-party service may have access to their name and email address for one year. After the one year time period has lapsed, the privacy policy manager may automatically revoke the given third-party's access to their name and email address by deleting appropriate references to data within the personal data store.

Aspects of the present disclosure provide technical advantages over the previous solutions. Aspects of the present disclosure may improve data security and privacy by enabling a data store management system to utilize a personal data store that shifts the responsibility of storing and managing data from third-party service providers to data subjects. Additionally, such features can provide an improved data store management system and UI that simplifies the process of a data subject identifying entities that have access to their data and granting, revoking, and modifying access to their data, thereby resulting in more efficient use of computing resources and avoiding consumption of computing resources otherwise required to allow data subjects to identify the entities having access to their data and to manage access to their data in accordance with conventional data protection techniques. Additionally, aspects of the present disclosure allow to reduce liability on service providers as the data subject's consent may be enforced for each instance of data collection and processing associated with the data subject.

FIG. 1 is an example of a system architecture 100 (generally referred to as "system 100" herein) for protecting data using a personal data store controlled by the data subject. The system 100 includes client devices 102A through 102N (referred to generally as "client devices 102" herein), a data store 110, a server machine 130, server machines 140A through 140N (referred to generally as "server machine(s) 140" herein), and server machine 150 connected via a network 108. The network 108 may include a public network (e.g., the Internet), a private network (e.g., a local area network (LAN) or wide area network (WAN)), or a combination thereof.

In implementations, network 108 may include a wireless infrastructure, which can be provided by one or more wireless communications systems, such as a wireless fidelity (Wi-Fi) hotspot connected with the network 108 or a wireless carrier system that can be implemented using various data processing equipment, communication towers, etc. Additionally or alternatively, network 108 can include a wired infrastructure (e.g., Ethernet).

In some implementations, data store 110 is a persistent storage that is capable of storing data as well as data structures to tag, organize, and index the data. In some embodiments, the data store 110 is a database with associated data structures, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, a non-relational database, and so forth, that can be hosted by one or more different machines (e.g., the server machine 130) via network 108. In some implementations, data store 110 can be a distributed database in which data is stored across multiple interconnected locations, while in other embodiments, data store 110 can be a centralize database in which data is stored in a single location.

In some implementations, the data store 110 includes data 112, data references 114A through 114N (referred generally as "data reference(s) 114" herein), and identifiers 116. The data 112 can be data associated with a user (also referred to as "data subject" here) of the system 100. In some embodiments, the data 112 can include personal data associated with a data subject. For example, the data 112 can include personally identifiable information (PII) and/or sensitive personally identifiable information (SPII) that can be used to identify the data subject either on its own or in combination with other data. Examples of PII can include, but is not limited to, full name, date of birth, social security number, driver's license number, home address, email address, phone number, financial account numbers, medical information, biometric data, internet protocol (IP) address, and the like. In some embodiments, data 112 can be non-PII personal data associated with the data subject. In some embodiments, data 112 can be associated with a particular data subject (or multiple data subjects such as multiple family members, a group of employees, a group of friends, etc.) and stored within a data store 110 dedicated to the particular data subject (or multiple data subjects such as multiple family members, a group of employees, a group of friends, etc.), such that data 112 collected and processed by third-party entities (e.g., server machines 140) can be stored within the data store 110 and managed by the data subject. Data store 110 may be any data structure having an associated access control mechanism, such as a table, a database, a file directory, a folder, etc. Access to data 112 can be managed based on one or more data references 114. In some embodiments, the data references 114 can be unique references to a specific element of the underlying data 112. A data reference 114 may serve as an access token to a specific element of data 112, indicating that a particular entity (e.g., third party service 141A) has access to the associated data. This may achieve data isolation as each entity may have a unique data reference 114 and entities are not aware of the underlying data structure or location. Accordingly, the owner (e.g., the data subject) can manage access to the data 112 by deleting an entity's data reference 114, thereby revoking the entity access to the data 112.

The server machine 130 may include a user interface (UI) engine 132, and a client application 134. The can provides a user interface (UI) 124A through 124N (referred to generally as "UI(s) 124 herein) for presentation on one or more client devices 102. The UI engine 132 can present the UI 124 via a web browser (not shown). Alternatively, the client device 102 may include a local (mobile or desktop) client application 134 that provides UI 124 and communicates with data store manager 152 and/or privacy policy manager 154 via network 108. In some implementations, the client application 134 (e.g., mobile application, desktop application, server-based application, etc.) can provide, for presentation on a display device 103A-103N, the UI 124 for users to interact with (e.g., update, modify, etc.) their data 112. The UI 124 may serve as a front-end through which users interact with and manipulate their data 112 and update access control policies associated with one or more server machines 140A through 140N. The UI 124 may include a graphical user interface (GUI), a wed-based interface, a command-line interface, a mobile application interface, and the like. The UI engine can provide the UI 124 to simplify the user access management (e.g., managing the usage, processing, and storage of their data 112) process. The UI engine 132 can provide the UI 124 to interact with the client application 134 in order to view and manage their privacy preferences (e.g., update third party access to data 112), view notifications and alerts regarding privacy policies, and view what entities have access to their data (e.g., a data privacy dashboard). In some embodiments, the client application 134 can handle authentication (e.g., verifying user identify) of the user.

In some implementations, a user can initiate a session of client application 134 on client device 102A. A session of the client application 134 can correspond to an interaction between a user and a DBMS (e.g., system 100) for a period of time, and can include a sequence of communications between a session start event and a session end event. The session start event can be triggered by the user providing credentials, such as a username as password (e.g., user login), to into the client application 134. The client application 134 can maintain a session state, which includes information about the user's identify, privileges, and preferences to ensure the DBMS can provide context-aware responses to user queries. The session end event can be triggered by the user logging out (e.g., a user logout). A user logout can occur automatically (e.g., based on network conditions or lack of user interaction with the application) or in response to a user request.

In some embodiments, the server machine 130 can help handle data request from one or more service providers. For example, a user (e.g., the owner and subject of data 112) may initiate a service request to a service provider 141 in which the service provider 141 requires data 112. The server machine 140 may receive an indication that the user has requested service and send a request to the user for access to the user's data 112. The UI engine 132 may generate a notification within a UI 124A presented on the client device 102A associated with the user. The user may interact with UI elements of the notification to approve or deny the third party request for access to the data 112. In response the user indicating approval of the request, the client application 134 may send a request to server machine 150 to provide the server machine 140 with access to the data 112.

Server machines 140A through 140N respectively include service providers 141A through 141N (referred to generally as "service provider(s) 141" herein), data references 114A through 114N (referred to generally as "data reference(s) 114" herein), obscured data 142A through 142N (referred to generally as "obscured data 142" herein), and access keys 144A through 144N (referred to generally as "access key(s)" herein). Service providers 141 can refer to a service provided by an entity organization that is not directly involved with data privacy and management services associated with server machine 130 and 150. Service providers 141 can include any entity or organization that seeks permission to access and use data 112 for any purpose, such as a set of services. In some instances, the data 112 can be requested in relation to online services, applications, or platforms that utilize data 112 to provide a specific functionality. For example, service providers 141 can include social media applications, email applications, health and fitness applications, cloud storage services, financial applications, and the like. Each of the server machines 140A-140N can receive respective data references 114A-114N, obscured data 142A-142N, and access keys 144A-144N as part of a response package from server machine 150, as described below.

Server machine 150 is responsible for managing data 112 and data references 114 within the data store 110. The server machine 150 can include a data store manager 152 and a privacy policy manager 154. Data store manager 152 is a component of server machine 150 responsible for efficiently storing, managing, retrieving, and manipulating data 112. The data store manager 152 can serve an intermediary between server machine 130 and data store 110. In some embodiments, the data store manager 152 may provide functionality such as data storage, data security, concurrency control, transaction management, indexing, data backup and recovery, query processing, and the like. In some embodiments, the data store manager 152 may include an application programming interface (API) to allow users to interact with the data store manager 152 without interacting with the UI 124 provided by the UI engine 132.

Privacy policy manager 154 can be a component to help manage access to data 112. In an illustrative example, privacy policy manager 154 can receive an approval indication from the user (e.g., via client application 134) to provide a service provider 141 with access to data 112. Responsive to receiving the approval indication from the user, the privacy policy manager 154 can generate a response package and send the response package to the server machine 140. In some embodiments, the response package may include obscured data 142, a data reference 114 (e.g., a pointer, a keypath, a uniform resource location (URL), etc.) to the data 112, and an access key 144. The obscured data 142A may be an obscured (e.g., encrypted) version of the data 112. The third-party service 141A can use the access key 144A to issue a query for the privacy policy manager 154 to obtain data 112 from the data store 110. The access key 144A can be a token, obscure key, or credential that the requester has appropriate permissions to access the data store 110 and obtain the data 112. The access key 144A may be used to authenticate and authorize the third-party third party service 141A before allowing access to the data store 110. In some embodiments, the access key 144A can be used to unobscure the obscured data 142A to obtain the data 112. The access key 144A may be credentials that include usemames and passwords, API keys, access tokens, digital certificates, single sign-on (SSO) tokens, and the like. In some embodiments, the access key 144A may be an obscured identifier of the third-party service 141A. Once the third-party service 141A has been authenticated using the provided access key 144A, the third-party service 141A may send the data reference 143A to the privacy policy manager 154. The privacy policy manager can provide the third-party service 141A with the data at the location indicated by the data reference 114A.

In some embodiments, a user can revoke access to their data 112 by deleting references 114 to the data 112. For example, a user may request, e.g., via the client application 134, to revoke third-party service 141A access to data 112. Responsive to receiving the revocation request, the privacy policy manager 154 can delete data reference 114A from the data store 110. Because service provider 141A maintains access to data 112 through the unique data reference 114A, deleting the data reference 114A from the data store 110 denies the third-party service 141A access to the data 112.

In some implementations, server machines 130, 140, and 150 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to access data store 110. In some implementations, the functions of server machines 130, 140, and/or 150 may be provided by a fewer number of machines. For example, in some implementations, components and/or modules of any of server machines 130 and 150 can be integrated into a single machine, while in other implementations components and/or modules of any of server machines 130 and 150 can be integrated into multiple machines. In general, functions described in implementations as being performed by any of server machines 130 and 150 can also be performed on the client devices 102A-N in other implementations. In addition, the functionality attributed to a particular component can be performed by different or multiple components operating together.

The client devices 102A-102N can include one or more processing devices communicatively coupled to memory devices and I/O devices. The client devices 102A-102N can be desktop computers, laptop computers, tablet computers, mobile phones (e.g., smartphones), or any suitable computing device. The client device 102A-102N can include components, such as an input device and an output device. A user can be authenticated by the server machine 130 and/or server machine 150 using a username and password (or other identification information) provided by a user via the user interface 124A-124N, such that the same client device 102A-102N can be used by different users at different times.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
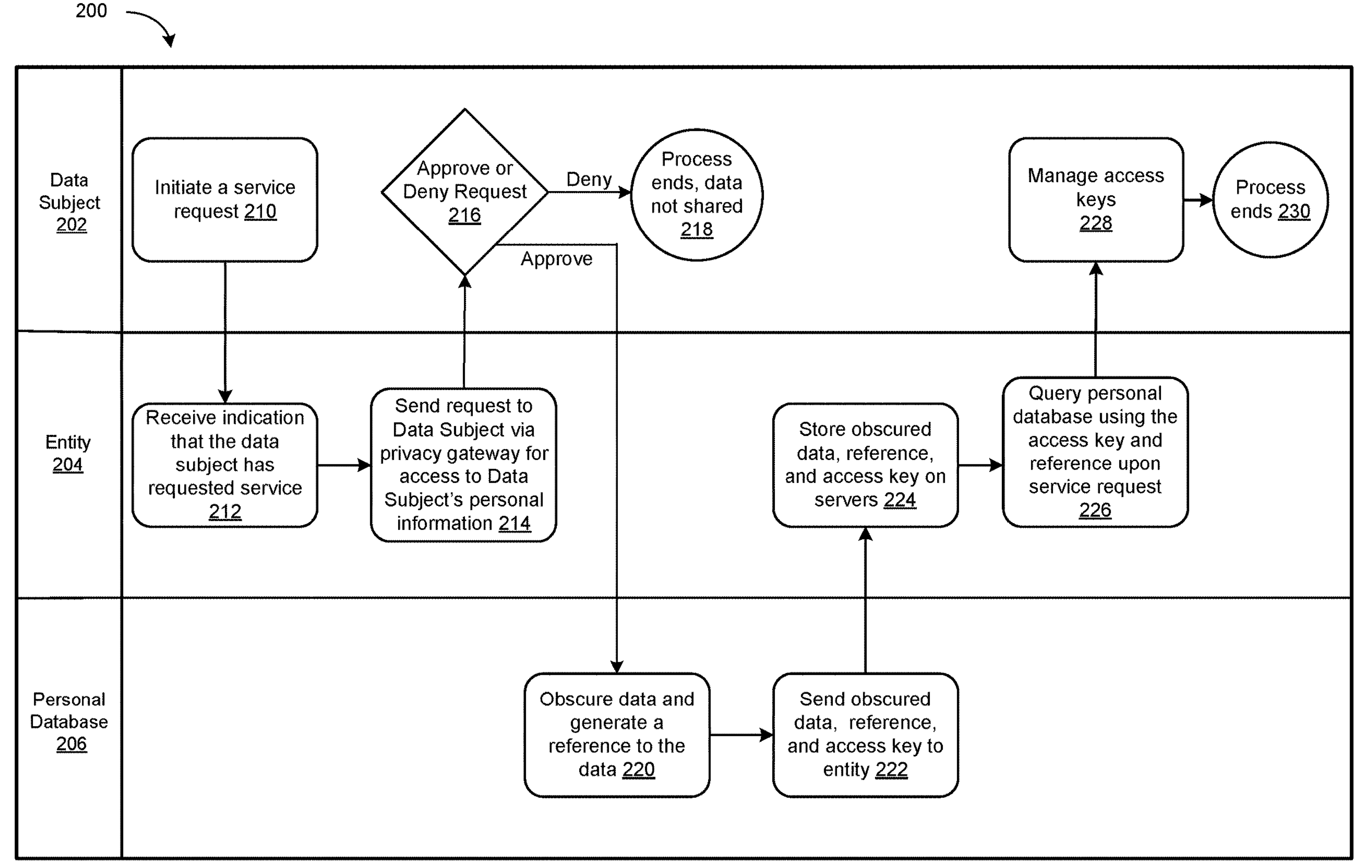
FIG. 2 is a diagram illustrating an example of protecting data using a personal data store controlled by the data subject, in accordance with at least one embodiment of the present disclosure.

FIG. 2 is a diagram illustrating an example method 200 for protecting data using a personal data store controlled by the data subject, in accordance with at least one embodiment of the present disclosure. The method 200 may be performed by processing logic that can include hardware (e.g., circuitry, dedicated logic, programmable logic, microcode, etc.), software (e.g., instructions run on a processing device to perform hardware simulation), firmware, or any combination thereof. In one embodiment, the method 200 can be performed by one or more components of the system 100 of FIG. 1. For example, one or more operations of the method 200 can be performed by server machines 130, 140, and/or 150 of FIG. 1.

The method 200 begins at operation 210 by a data subject 202 initiating a service request to an entity 204, such as a service provider 141 of FIG. 1. The data subject 202 is an individual who is the subject or the person to whom data stored within a personal data store 206 relates. Additionally, the data subject 202 may include a fundamental concept that refers to a living person who can be identified (directly or indirectly) by personal data stored within the personal data store 206. An entity 204 may refer to systems/platforms of service providers (e.g., social media networks, email providers, etc.), organizations (e.g., financial institutions, employers, etc.), and any other entity that may request access to data associated with the data subject 202.

At operation 212 of the method 200, an entity 204 receives an indication that the data subject 202 has requested service. In some embodiments, the entity 204 may require additional information associated with the data subject 220 to process the request and provide the requested service. In an illustrative example, the entity 204 may be a social media platform that requires various types of data to provide their services and functionality. For example, the entity 204 may require an email address to create a user account for the data subject 202 and enable login, full name to personalize a user profile, contact information such as a phone number for account recovery and communication, and the like.

At operation 214 of the method 200, the entity 204 sends a request for access to personal information associated with the data subject 202. For example, the entity 204 may request an email address, full name, and phone number associated with the data subject 202 to create a user profile. In some embodiments, the entity 204 can send the request via a privacy gateway. For example, the entity 204 may send the request through a privacy-focused intermediary or service before reaching the data subject 202. The privacy gateway may enhance data privacy, security, and control for both the entity 204 and the data subject 202. In some embodiments, the privacy gateway may encrypt the request to ensure secure transmit, or otherwise mask information within the request.

At operation 216 of the method 200, the data subject 202 approves or denies (e.g., via a client device 102) the request from the entity 204 to access the data associated with the data subject 202. Responsive to the data subject 202 denying the request, the method 200 proceeds to operation 218. At operation 218, the process ends, and the data associated with the data subject 202 is not shared. Responsive to the data subject 202 approving the request, the method 200 proceeds to operation 220. In some embodiments, the data subject 202 may provide a response to the request from the entity 204 by engaging with an approval GUI element or a rejection GUI element provided via a GUI of a client device by a client application, as illustrated below with respect to FIG. 3.

At operation 220 of the method 200, a personal data store manager and/or a privacy policy manager obscures the data and generates a reference to the data (within personal data store 206) associated with the data subject 202. The personal data store 206 may be associated with the data subject 202 to store, manage, and organize data associated with the data subject 202. In some embodiments, the data may be personal data such personally identifiable information (PII) or sensitive data associated with the data subject 202. In some embodiments, the personal data store manager and/or privacy policy manager can obscure identifiers of the data subject 202 that may be used to attribute the data back to the data subject 202. In some embodiments, to obscure the data, the personal data store manager and/or privacy policy manager may anonymize the data by removing or altering identifiers in the data to ensure the data cannot be linked back to the data subject 206. This technique may include replacing names with generic labels, removing direct identifiers (e.g., social security numbers), and the like. It is appreciated that the data can be obscured based on a variety of other data obfuscation techniques such as data masking, tokenization, encryption, hashing, and the like.

At operation 222 of the method 200, the personal data store manager and/or privacy policy manager sends the obscured data, the reference to the data, and an access key to the entity. The entity 204 may use the obscured data as a placeholder for the data until the entity 204 requires the actual data. The entity 204 can use the access key to issue queries related to the personal data store 206. The access key may be a token or credential that the entity 204 has appropriate permissions to access data of the data store 110. The access key may be used to authenticate and authorize entity 204 before allowing the entity to access to the data of the personal data store 206. The access key may include, but is not limited to, usernames and passwords, API keys, access tokens, digital certificates, single sign-on (SSO) tokens, and the like.

At operation 224 of the method 200, the entity 204 stores the obscured data, the reference to the data, and the access key on its server, such as server machine 140A of FIG. 1.

At operation 226 of the method 200, the entity 204 issues a query related to the personal data store 206 using the access key and the data reference upon service request from the data subject 202. Once the entity 204 has been authenticated using the provided access key, the personal data store manager and/or privacy policy manager may provide data from the location in the personal data store 206 indicated by the data reference.

At operation 228 of the method 200, the data subject 202 manages access keys. In some embodiments, the data subject 202 may revoke access to the data by causing the data reference associated with the entity 204 to be deleted from the personal data store 206. In some embodiments, the data subject 202 may manage access to the personal data store 206 subject to contractual obligations. For example, the entity 204 may provide a service to the data subject 202 for which the data subject is contractually obligated to pay for on a monthly billing schedule. The entity 204 may need a billing address and a credit card number associated with the data subject 202 to charge the data subject for their service per a contractual agreement. Accordingly, the personal data store manager and/or privacy policy manager may prevent the data subject 202 from deleting data references associated with the entity 204 that indicate the locations within the personal data store corresponding to the data subject's 202 credit card number and billing address.

In some embodiments, the data subject 204 may update records within the personal data store 206 without changing their location in storage reference by references or pointers associated with one or more entities that are authorized to access the data. In some embodiments, the data subject 202 may authorize the entity 204 to have access to the requested data for a period of time before automatically deleting the data reference and revoking access to the data. For example, the data subject may designate (e.g., via a GUI of a client device) an amount of the time to provide the entity 204 with access to A first data. When the designated amount of time lapses, the personal data store manager and/or privacy policy manager may automatically delete the data reference associated with the entity 204 that references the location of the first data.

At operation 230, the process ends.

Figure 3:
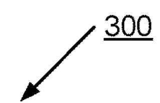
FIG. 3 depicts an example of a user interface (UI) for responding to a request for a third-party service to access data, in accordance with at least one embodiment of the present disclosure.
Figure 3:
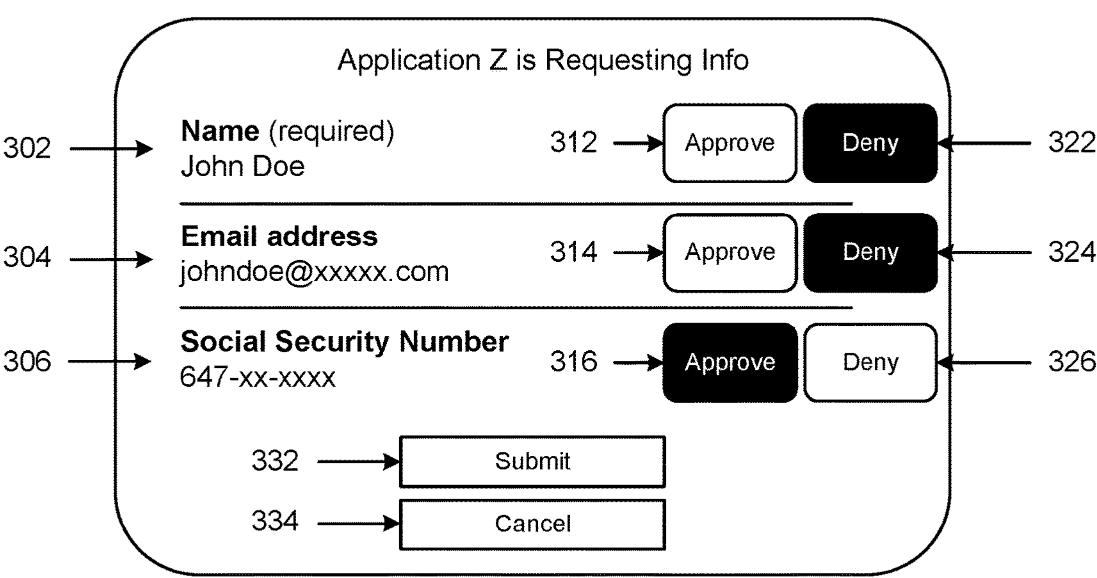

FIG. 3 illustrates an exemplary user interface (UI) 300 for responding to a request for an entity to access data, in accordance with at least one embodiment of the present disclosure. In some embodiments, the UI 300 is provided by a UI engine (e.g., UI engine 132 of FIG. 1) of a frontend of a privacy policy manager 154 for presentation on a client device (e.g., client device 102 of FIG. 1). In some embodiments, the UI 300 includes the name of the entity requesting information from the data subject and the data that the entity is requesting. Specifically, UI 300 illustrates Application Z requesting the data subject's name, email address, and social security number. The UI 300 includes a name field 302, an email address field 304, and a social security number field 306. In some embodiments, the UI engine may automatically populate the name field 302, email address field 304, and social security number field 306 with corresponding data from a personal data store (e.g., data store 110 of FIG. 1) associated with the data subject to display to the user.

In some embodiments, UI 300 can additionally include UI elements that enable the data subject to provide an indication of an approval decision for data requested by the entity. For example, the UI 300 can include an approve button 312, an approve button 314, an approve button 316, a deny button 322, a deny button 324, and a deny button 326. The approve button 312 and deny button 322 correspond to the name field 302, the approve button 314 and deny button 324 correspond to the email address field 304, and the approve button 316 and the deny button 326 correspond to the social security number field 306. Responsive to detecting a user selection of a particular approve button or deny button, the UI 300 may be updated to indicate the current approval status. For example, the data subject may interact with the approve button 312 and the approve button 314 to indicate a current approval to provide the requesting entity with access to data subject's name and email address. The data subject may interact with the deny button 326 to indicate a current refusal to provide the requesting entity with access to the data subject's social security number. The UI 300 may include additional UI elements to submit or cancel a current approval of requested data. For example, the UI 300 may include a submit button 332 and a cancel button 334. Responsive to detecting a user interaction with the submit button 332, the client device may transmit an indication of the current approval corresponding to the selected approve and deny UI elements. For example, responsive to detecting a user interaction the submit button 332, the client device may transmit a notification to the privacy policy manager regarding the personal data store associated with the data subject, where the notification indicates that the data subject has approved the entity's request to access the name and address of the data subject and denied the entity's request to access the social security number of the data subject. Responsive to detecting a user interaction with the cancel button 334, the client device may transmit a notification to the privacy policy manager indicating that the data subject has denied the entity's request to access the requested data associated with the data subject.

In some embodiments, the privacy policy manager may receive the notification indicating the data subject's response to the entity's request to access data. Responsive to receiving the notification, the privacy policy manager may generate and send a response package to the entity according to the approval decision from the data subject. The response package can include an obscured version of the data, an access key, and a reference to the data within the data store. The entity may use the access key and the reference to the data to issue queries related to the personal data store, as described above.

Figure 4:
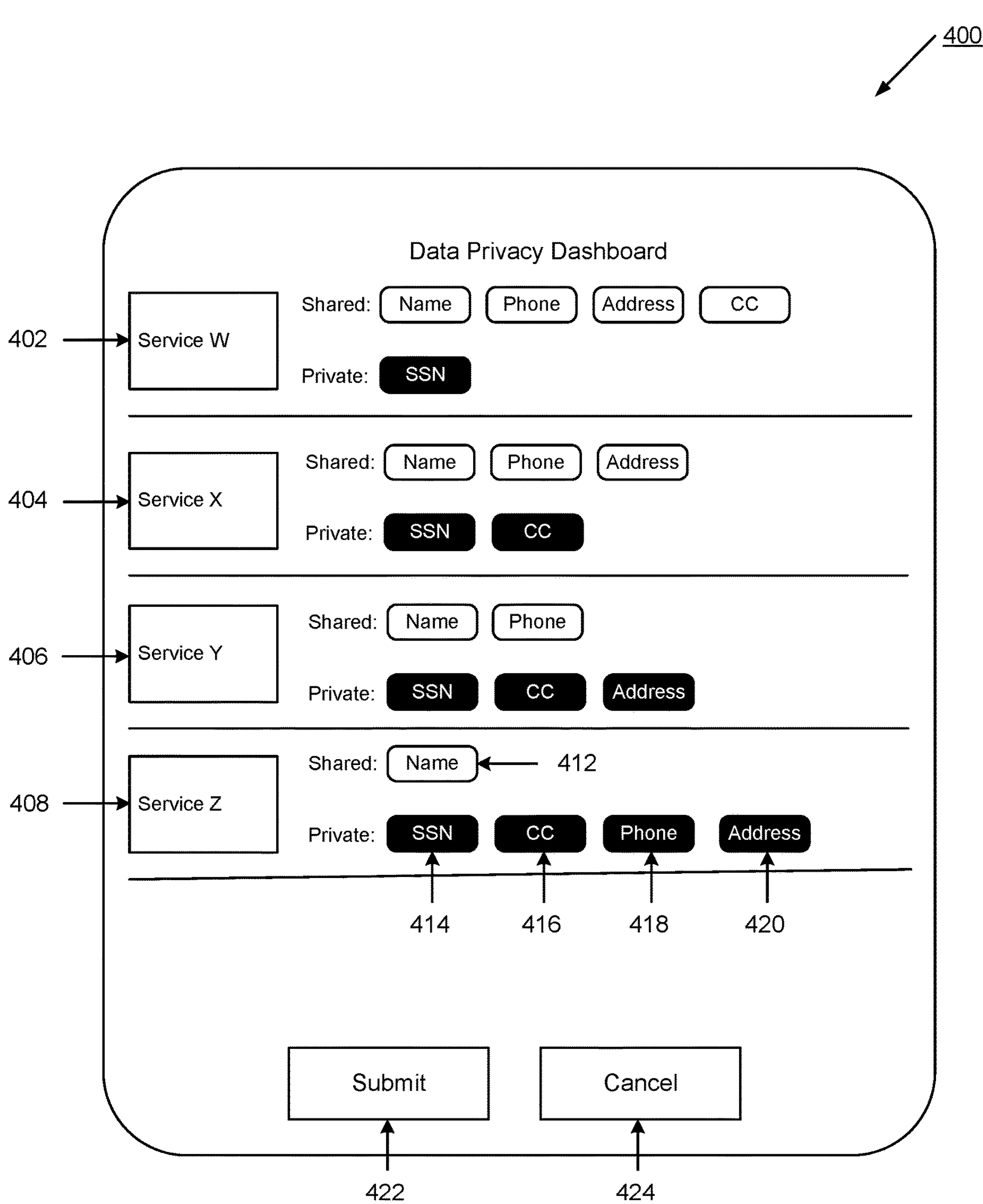
FIG. 4 illustrates an exemplary UI for enabling a data subject to manage access to their data, in accordance with at least one embodiment of the present disclosure.

FIG. 4 illustrates an exemplary user interface (UI) 400 for enabling a data subject to manage access to their data, in accordance with at least one embodiment of the present disclosure. In some embodiments, the UI 400 is provided by a UI engine (e.g., UI engine 132 of FIG. 1) of a frontend of a privacy policy manager for presentation on a client device (e.g., client device 102 of FIG. 1). Specifically, the UI 400 is a privacy dashboard that displays information about how a data subject's data is shared and provides data subjects with the ability to control and customize their privacy preferences. In some embodiments, the UI 400 includes what data is being shared and the entities with whom the data is being shared. In the illustrated example, the UI 400 indicates that information associated with the data subject is currently being shared with a Service W 402, a Service X 404, a service Y 406, and a service Z 408. Specifically, the data subject's name, phone number, home address, and credit card number are currently being shared with Service W 402, as indicated by the corresponding UI elements within the region of the UI 400 labeled "Shared" associated with service W 402. The data subject's social security number (SSN) is currently not being shared with Service W 402, as indicated by the corresponding UI element within region of the UI 400 labeled "Private" associated with the Service W 402. The data subject is currently sharing their name, phone number, and address with Service X 404 while not sharing their SSN credit card number with Service X 404. The data subject is currently sharing their name and phone number with Service Y 406 while not sharing their SSN, credit card number, and address with Service Y 406. The data subject is currently sharing their name with Service Z 408 while not sharing their SSN, credit card number, phone number, and address with Service Z 408.

The UI 400 includes one or more toggleable UI elements associated with each service the data subject shares their data with. For example, the UI 400 include UI elements 412, 414, 416, 418, and 420 associated with Service Z 408. UI element 412 corresponds to the name of the data subject, UI element 414 corresponds to the SSN of the data subject, UI element 416 corresponds to the credit card number of the data subject, UI element 418 corresponds to the phone number of the data subject, and UI element 420 corresponds to the address of the data subject. UI element 412 in located adjacent to the region labeled "shared," indicating that Service Z 408 is currently able to query the data subject's personal databasing using an associated access key data reference to obtain the data subject's name, as described in detail above. Responsive to detecting a user interaction with the UI element 412, the UI 400 be updated to display the GUI element 412 adjacent to the region associated with Service Z 408 labeled "Private," indicating a pending privacy status change. In some embodiments, the UI 400 may include a submit button 422 and a cancel button 424. Responsive to detecting a user interaction with the cancel button 424, the client device may cancel any pending privacy status changes. Responsive to detecting a user interaction with the submit button 422, the client device may transmit an indication of the change of privacy status corresponding to the selected UI elements. For example, responsive to detecting a user interaction the submit button 412, the client device may transmit a notification to the privacy policy manager indicating the data subject has requested to revoke Service Z 408 access to the data subject's name. In response to receiving the notification, the privacy policy manager may cause the data reference to the data subject's name corresponding to Service Z 408 to be deleted, thereby revoking access previously granted to Service Z 408 to access the data subject's name.

Figure 5:
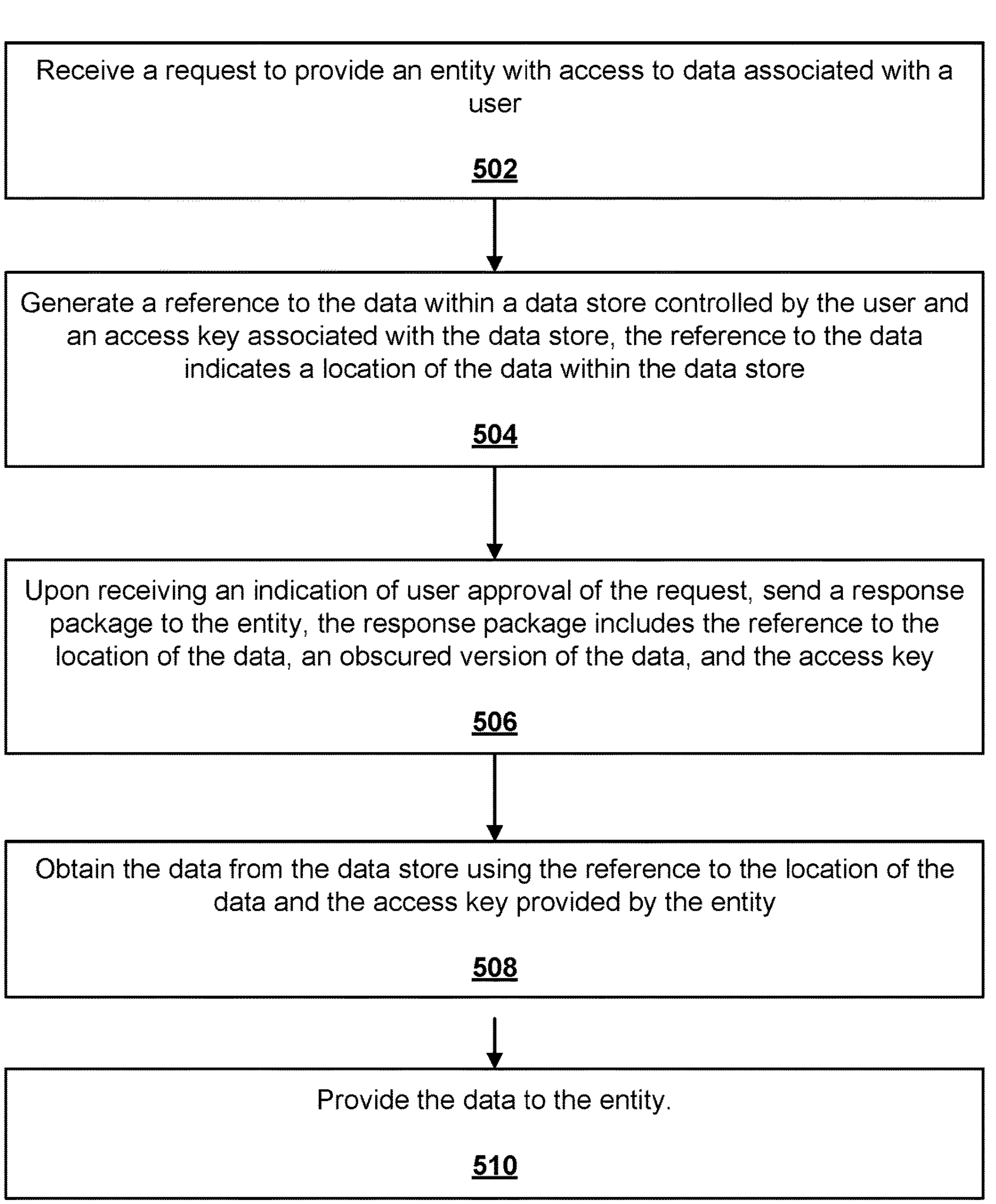
FIG. 5 depicts an example method for protecting data using a personal data store controlled by the data subject, in accordance with at least one embodiment of the present disclosure.

FIG. 5 depicts a flow diagram of a method 500 for protecting data using a personal data store controlled by the data subject, in accordance with at least one embodiment of the present disclosure. Method 500 may be performed by processing logic that may include hardware (circuitry, dedicated logic, etc.), software (e.g., instructions run on a processing device), firmware, and/or a combination thereof. In one implementation, some or all the operations of method 500 may be performed by one or more components of system 100 of FIG. 1 (e.g., server machine 130, server machine 140, server machine 150, privacy policy manager 154, etc.).

For simplicity of explanation, the method 500 of this disclosure is depicted and described as a series of acts. However, acts in accordance with this disclosure may occur in various orders and/or concurrently, and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. Additionally, it should be appreciated that the method 500 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 502, processing logic receives a request to provide an entity, such as service provider 141 of FIG. 1, with access to data associated with a user. In some embodiments, the request to provide the entity with access to the data is received via a privacy gateway.

At operation 504, processing logic generates a reference to the data within a data store controlled by the user and an access key associated with the data store. The reference to the data indicates a location of the data within the data store.

At operation 506, upon receiving an indication of user approval of the request, processing logic sends a response package to the entity. The response package includes the reference to the location of the data, an obscured version of the data, and the access key.

At operation 508, the processing logic obtains the data from the data store using the reference to the location of the data and the access key provided by the entity. In some embodiments, to obtain the data, the processing logic may authenticate the entity using the access key and obtain data from the data store using the location reference provided by the entity.

At operation 510, the processing logic provides the data to the entity.

In some embodiments, the processing logic can revoke access privileges of the entity to the data associated with the user. In some embodiments, the processing logic can revoke the access privileges of the entity to the data in response to a user indication to revoke the access privileges of the entity to the data. In some embodiments, the processing logic can revoke the access privileges of the entity in response to exceeding a threshold amount of time. In some embodiments, to revoke access privileges of the entity to the data, the processing logic can delete the reference to the data from the data store.

In some embodiments, the processing logic can receive a user request from a client device associated with the user to modify the data. The request is received responsive to a user interaction with one or more GUI elements of an application associated with the data store. The processing logic can update the data within the data store in response to the user request.

Figure 6:
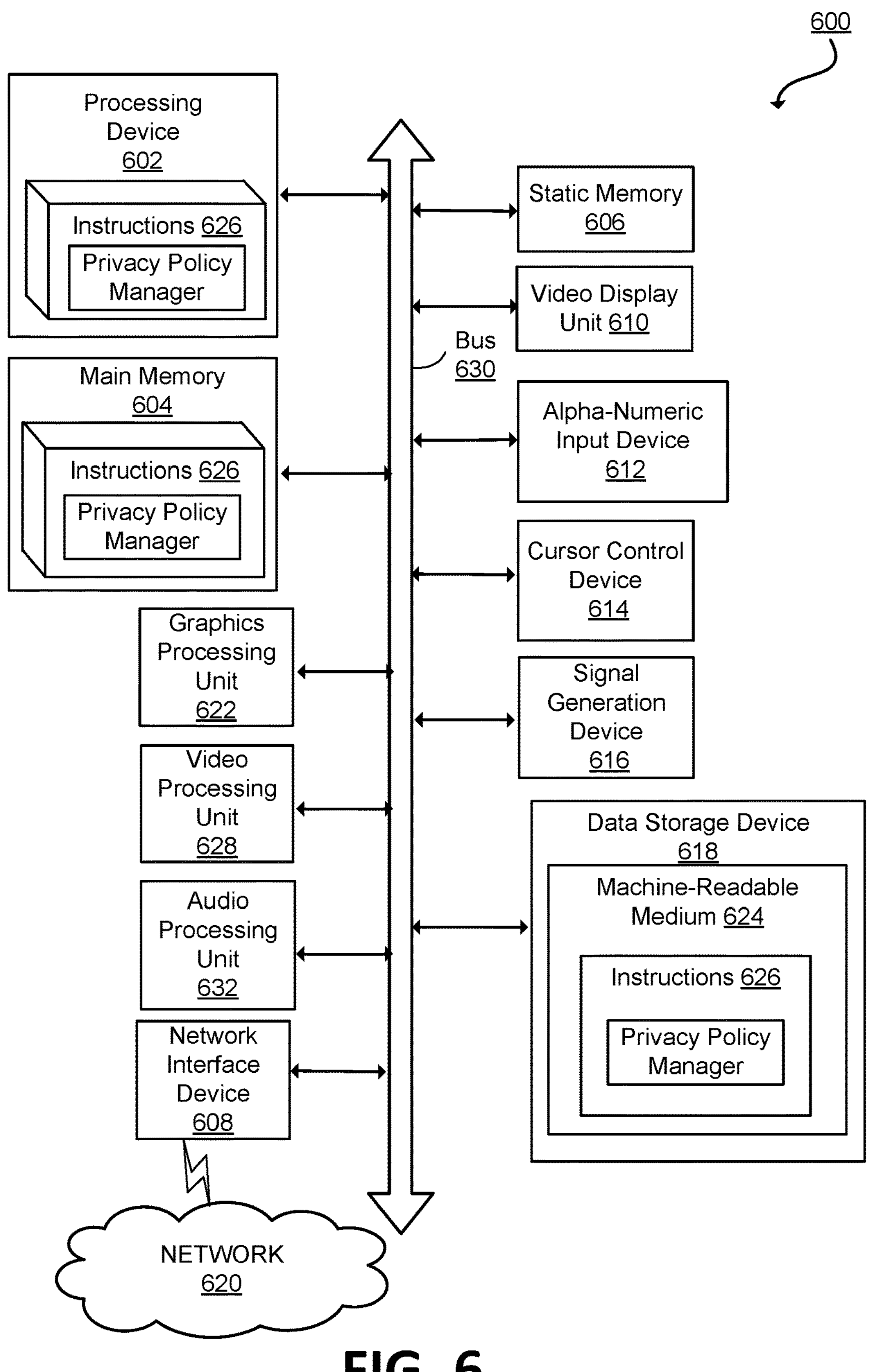
FIG. 6 depicts a block diagram of an example computing device operating in accordance with at least embodiment of the present disclosure.

FIG. 6 illustrates an example machine of a computer system 600 within which a set of instructions, for causing the machine to perform any one or more of the methodologies discussed herein, can be executed, in accordance with aspects and implementations of the present disclosure. The computer system 600 may be server machines 130-150 or client devices 102A-N of FIG. 1. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM), a static memory 606 (e.g., flash memory, static random-access memory (SRAM), etc.), and a data storage device 618, which communicate with each other via a bus 630.

Processing device 602 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps described herein.

The computer system 600 can further include a network interface device 608 to communicate over the network 620. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 can include a machine-readable storage medium 624 (also known as a non-transitory computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interact between several components and/or blocks. It can be appreciated that such systems, engines, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 500 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving a request to provide an entity of a plurality of entities with access to data associated with a user;

generating a reference to the data within a data store controlled by the user and an access key associated with the data store, wherein the reference to the data indicates a location of the data within the data store, wherein the reference to the data is generated for the entity and is different from references to the data that were generated for other entities of the plurality of entities;

upon receiving an indication of user approval of the request, sending a response package to the entity, wherein the response package comprises the reference to the data, an obscured version of the data, and the access key, wherein the obscured version of the data is provided to the entity as a placeholder in lieu of providing the data to the entity;

obtaining the data from the data store using the reference to the data and the access key provided by the entity; and causing the data from the data store to be provided to the entity.

2. The method of claim 1, wherein obtaining the data from the data store using the reference to the data and the access key provided by the entity comprises:

authenticating the entity using the access key; and obtaining the data from the location of the data within the data store indicated by the reference to the data.

3. The method of claim 1, wherein the request to provide the entity with access to the data associated with the user is received via a privacy gateway.

4. The method of claim 1, further comprising revoking access privileges of the entity to the data associated with the user.

5. The method of claim 4, wherein revoking access privileges of the entity to the data is performed in response to a user indication to revoke the access privileges of the entity to the data.

6. The method of claim 4, wherein revoking access privileges of the entity to the data is performed in response to exceeding a threshold amount of time.

7. The method of claim 4, wherein revoking access privileges of the entity to the data associated with the user comprises deleting the reference to the data from the data store.

8. The method of claim 1, further comprising:

receiving a user request from a client device associated with the user to modify the data, wherein the request is received responsive to a user interaction with one or more GUI elements of an application associated with the data store; and updating the data within the data store in response to the user request, wherein the updated data is accessible using the reference to the data.

9. A system comprising:

a memory device; and a processing device coupled to the memory device, the processing device to perform operations comprising:

receiving a request to provide an entity of a plurality of entities with access to data associated with a user;

generating a reference to the data within a data store controlled by the user and an access key associated with the data store, wherein the reference to the data indicates a location of the data within the data store, wherein the reference to the data is generated for the entity and is different from references to the data that were generated for other entities of the plurality of entities;

upon receiving an indication of user approval of the request, sending a response package to the entity, wherein the response package comprises the reference to the data, an obscured version of the data, and the access key, wherein the obscured version of the data is provided to the entity as a placeholder in lieu of providing the data to the entity;

obtaining the data from the data store using the reference to the data and the access key provided by the entity; and causing the data from the data store to be provided to the entity.

10. The system of claim 9, wherein the request to provide the entity with access to the data associated with the user is received via a privacy gateway.

11. The system of claim 9, the operations further comprising revoking access privileges of the entity to the data associated with the user.

12. The system of claim 11, wherein revoking access privileges of the entity to the data is performed in response to a user indication to revoke the access privileges of the entity to the data.

13. The system of claim 11, wherein revoking access privileges of the entity to the data is performed in response to exceeding a threshold amount of time.

14. The system of claim 11, wherein revoking access privileges of the entity to the data associated with the user comprises deleting the reference to the data from the data store.

15. The system of claim 9, the operations further comprising, providing, for presentation on a client device associated with the user, one or more GUI elements of an application associated with the data store that allow the user to perform one or more of indicating user approval or denial of the request, revoking access to the data, or modifying the data.

16. The system of claim 15, wherein modifying the data comprises:

receiving a user request from a client device associated with the user to modify the data, wherein the request is received responsive to a user interaction with the one or more GUI elements of the application associated with the data store; and updating the data within the data store in response to the user request, wherein the updated data is accessible using the reference to the data.

17. A non-transitory computer-readable storage medium comprising instructions for a server that, when executed by a processing device, cause the processing device to perform operations comprising:

receiving a request to provide an entity of a plurality of entities with access to data associated with a user;

generating a reference to the data within a data store controlled by the user and an access key associated with the data store, wherein the reference to the data indicates a location of the data within the data store, wherein the reference to the data is generated for the entity and is different from references to the data that were generated for other entities of the plurality of entities;

upon receiving an indication of user approval of the request, sending a response package to the entity, wherein the response package comprises the reference to the data, an obscured version of the data, and the access key, wherein the obscured version of the data is provided to the entity as a placeholder in lieu of providing the data to the entity;

obtaining the data from the data store using the reference to the data and the access key provided by the entity; and causing the data from the data store to be provided to the entity.

18. The non-transitory computer-readable storage medium of claim 17, wherein obtaining the data from the data store using the reference to the data and the access key provided by the entity comprises:

authenticating the entity using the access key; and obtaining the data from the location of the data within the data store indicated by the reference to the data.

19. The non-transitory computer-readable storage medium of claim 17, wherein the request to provide the entity with access to the data associated with the user is received via a privacy gateway.

20. The non-transitory computer-readable storage medium of claim 17, further comprising revoking access privileges of the entity to the data associated with the user.

* * * * *